(No Model.) 2 Sheets—Sheet 2.

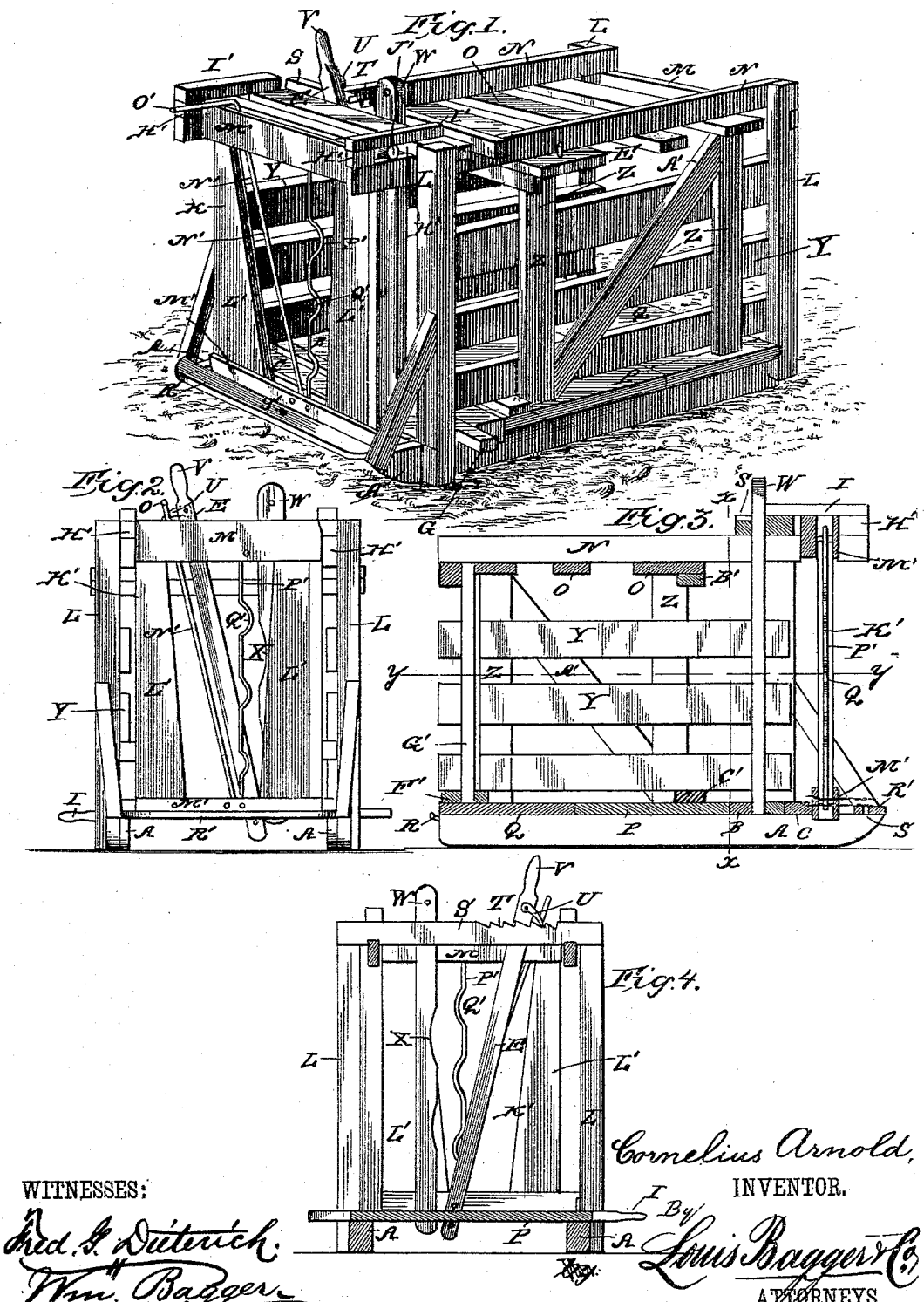

C. ARNOLD.
HOG TRAP.

No. 325,473. Patented Sept. 1, 1885.

WITNESSES:
Fred. G. Dieterich.
Wm. Bagger.

Cornelius Arnold,
INVENTOR.
by Louis Bagger & Co.,
ATTORNEYS.

UNITED STATES PATENT OFFICE.

CORNELIUS ARNOLD, OF RAYMOND, ILLINOIS.

HOG-TRAP.

SPECIFICATION forming part of Letters Patent No. 325,473, dated September 1, 1885.

Application filed March 20, 1885. (No model.)

*To all whom it may concern:*

Be it known that I, CORNELIUS ARNOLD, a citizen of the United States, and a resident of Raymond, in the county of Montgomery and State of Illinois, have invented certain new and useful Improvements in Hog-Traps; and I do hereby declare that the following is a full, clear, and exact description of the invention, which will enable others skilled in the art to which it appertains to make and use the same, reference being had to the accompanying drawings, which form a part of this specification, and in which—

Figure 5:
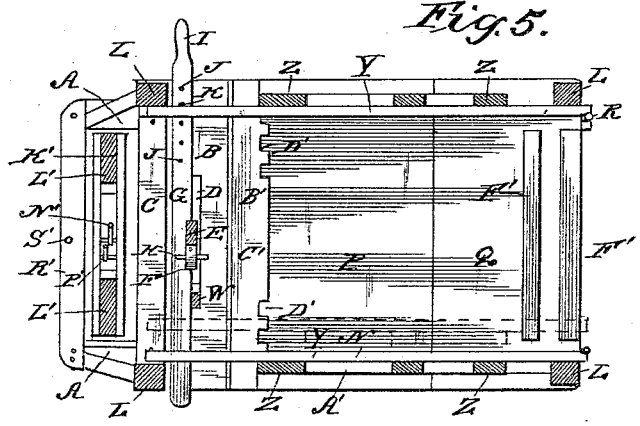
Figure 6:
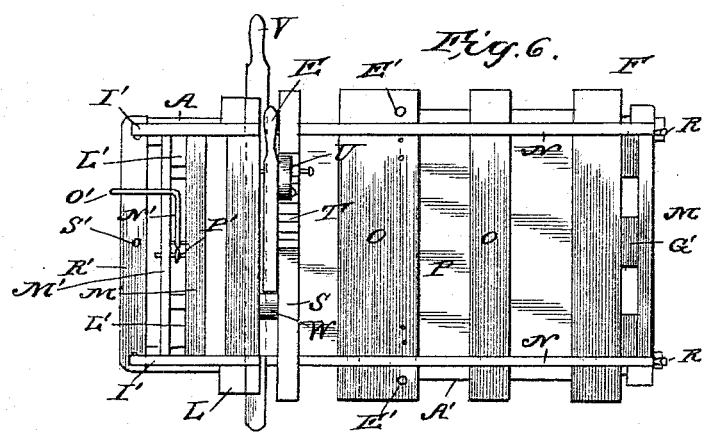

Figure 1 is a perspective view of my improved hog-trap. Fig. 2 is a front view of the same. Fig. 3 is a longitudinal vertical sectional view taken centrally through the trap. Fig. 4 is a transverse vertical sectional view taken on the line $x\,x$ in Fig. 3. Fig. 5 is a horizontal sectional view taken on the line $y\,y$ in Fig. 3, with dotted lines showing one of the sides adjusted to a different position; and Fig. 6 is a top view.

The same letters refer to the same parts in all the figures.

This invention relates to hog traps, or devices for holding hogs while being ringed or castrated; and it has for its object to produce a device of this class which shall possess superior advantages in point of simplicity, durability, and general efficiency.

With these ends in view the invention consists in the improved construction and arrangement of parts, which will be hereinafter fully described, and particularly pointed out in the claims.

In the drawings hereto annexed, A A designate the longitudinal sills of my improved hog-trap, which are rounded at their front ends like sled-runners, in order that the device may be readily drawn over the ground to the place where it is to be used. These sills are connected, at some distance from their front ends, by cross-pieces B and C, the rear one of which, B, is mortised over the said sills, so as to bind them firmly together. The front side of the cross-piece B has a notch or recess, D, to afford working room for a lever, E, which is fitted in a small notch, F, in a slide, G, sliding between the pieces B and C, and retained in position by means of pins H H above and below the said slide, which latter is provided at one end with a handle, I, by means of which it may be conveniently manipulated. Said slide is provided with a series of perforations, J J, any one of which may be adjusted over a pin, K, projecting upward from one of the sills, and serving to retain the said slide in any position to which it may be adjusted.

The sills A A are provided, at their rear ends and near their front ends, with uprights L L, having cross-pieces M M, connected by longitudinal bars N N, to the under sides of which the top pieces, O O, of the trap are bolted or otherwise secured. The bottom of the trap is formed by a permanent plank floor, P, laid transversely upon the sills in rear of the cross-piece B and a detachable floor, Q, laid in rear of the permanent floor and held in position by means of pins R, which may be readily withdrawn when it is desired to remove the said detachable floor.

The bars N N are connected, a short distance in rear of the front cross-piece M, by a cross-bar, S, having a series of teeth or notches, T T, adapted to engage a pawl, U, upon the upper end of the lever E, which extends up between the bars M and S, and is provided with a handle, V. The said lever may thus be retained securely in position with reference to a vertical post, W, the lower end of which is secured to the cross-piece B, and the upper end of which is firmly secured between the bars M and S. The post W is provided on the side adjoining the lever with one or more shallow curved or beveled recesses X X, adapted to receive the neck of the hog, which is to be held by means of the lever E, as will be presently more fully described.

The sides of the trap, which are detachable at will, are constructed of slats Y Y, connected by vertical braces Z Z and diagonal braces A'. B' and C' are cross-pieces, secured transversely, respectively under the top and upon the floor of the trap, some distance from the front, in a line with each other, and provided in their rear sides with a series of notches, D', in which the upper and lower ends of the front braces Z of the sides may be adjusted, and where they may be retained by means of pins E', inserted through perforations in the top of the trap, so as to bear against the rear sides of the front braces Z. When the sides are to be adjusted or removed, the said pins are withdrawn, and the sides drawn back until their front ends will swing clear of the frame.

The rear end of the detachable floor is provided with a pair of transverse slats, F', adapted to retain the lower ends of the planks G', which form the door at the rear end of the trap, the upper ends of which are inserted between the rear cross-piece M and the rear slat of the top. This door, however, is only intended to be used when the trap is used for the transportation of hogs.

The front ends of the longitudinal bars N, which extend in front of the uprights L, are provided with blocks H', connected with the front cross-piece M by means of braces I', forming slots K', into which extend trunnions or pivots J', extending laterally from the upper end of the adjustable frame K. The latter consists of two vertical planks, L' L', one or both of which may be beveled on the inner side, as shown, and which are connected at their upper and lower ends by cross-pieces M' M'. Between the lower cross-pieces is pivoted a lever, N', extending between the upper cross-pieces, and having a handle, O', at its upper end. Secured between the upper and lower cross-pieces adjoining the said lever is a vertical rod, P', having a series of curves or corrugations, Q', adapted to receive the noses of hogs of various sizes, which may thus be held, by means of the lever N', while being ringed. The sills of the machine are connected at their front ends by a cross-piece, R', which prevents the lower end of the frame from swinging forward and outward. Said cross-piece is provided with a perforation, S', to receive a clevis, to which draft may be attached when the trap is to be moved from one place to another.

The operation of my improved hog-trap will be readily understood from the foregoing description, taken in connection with the drawings hereto annexed. The hogs are driven singly into the trap from a suitably-constructed chute, directly in front of which the trap is meanwhile placed. When a hog enters the trap, his neck is grasped between the post W and the lever E, and held securely by the pawl U of said lever engaging one of the teeth or notches in the cross-bar S. The adjustable frame at the front of the trap is then adjusted to the nose of the hog, which is grasped and held securely in one of the curves Q' in rod P' by means of the lever N', thus preventing the hog from flinching while the nose-ring is being adjusted. After the performance of this operation one of the sides of the trap may be released and swung outward like a gate, thus permitting the hog to escape from the trap into a different lot from his companions.

For the purpose of castrating, after the hog is admitted into the trap and grasped by the neck by the post W and lever E, one of the adjustable sides of the trap is moved up closely against the side of the hog and secured. The trap is then tilted over on its side, and the detachable bottom removed, after which the legs of the hog may be tied or held, and the operation performed with ease and safety.

My improved hog-trap is simple in construction, easily manipulated, and enables a single or, at most, two men to handle the hogs with ease and safety.

Having thus described my invention, I claim and desire to secure by Letters Patent of the United States—

1. In a hog-trap, the combination, with a frame or pen mounted upon sills, of cross-pieces connecting said sills near the front end of the trap, one of said cross-pieces being provided with a notch or recess, a slide sliding between said cross-pieces, and having a small notch and a series of perforations engaging a pin extending upward from one of the sills, a lever fitted in the notches of the slide and cross-piece, and retained by transverse pins above and below the cross-pieces, cross-pieces at the top of the trap between which the handle of the lever extends, a pawl upon said lever engaging notches in one of said upper cross-pieces, and a vertical post secured between the upper and lower cross-pieces adjoining the said lever, substantially as and for the purpose herein set forth.

2. A hog-trap consisting of a pen or frame, the lower and upper sides of the top and bottom of which are provided with transverse cross-pieces, each provided with a series of notches registering with each other, in combination with the herein-described adjustable and detachable sides, consisting, essentially, of slats connected by vertical and diagonal braces, and the retaining-pins adapted to be inserted through perforations in the top of the trap in rear of the front braces of the sides, substantially as and for the purpose herein set forth.

3. In a hog-trap, the combination, with a pen or frame constructed substantially as described, of a longitudinally-adjustable frame at the front end of said trap having a vertical corrugated rod and a clamping-lever, substantially as and for the purpose herein set forth.

4. The combination, with a hog-trap having the herein-described adjustable neck-holding device, of a longitudinally sliding and adjustable front frame suspended on trunnions in slots at the sides of the upper part of the front of the frame, and having a vertical corrugated rod and a clamping-lever to hold the nose of the hog, and a cross-piece at the front end of the trap-frame, to prevent the lower end of the front frame from swinging forward and outward, substantially as and for the purpose set forth.

5. In a hog-trap, the herein-described sliding and adjustable front frame, having beveled side pieces and a nose-clamping device, substantially as herein shown and described, for the purpose specified.

In testimony that I claim the foregoing as my own I have hereunto affixed my signature in presence of two witnesses.

CORNELIUS ARNOLD.

Witnesses:
ROBERT H. HUGHES,
FRANK BARTON.